(12) United States Patent
Singh et al.

(10) Patent No.: US 9,893,971 B1
(45) Date of Patent: Feb. 13, 2018

(54) VARIABLE TIMEOUTS FOR NETWORK DEVICE MANAGEMENT QUERIES

(71) Applicant: Juniper Networks, Inc., Sunnyvale, CA (US)

(72) Inventors: Vivek Singh, Mathura (IN); Subodh Kumar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 1141 days.

(21) Appl. No.: 13/732,058

(22) Filed: Dec. 31, 2012

(51) Int. Cl.
*G06F 15/16* (2006.01)
*H04L 12/26* (2006.01)

(52) U.S. Cl.
CPC ................... *H04L 43/0876* (2013.01)

(58) Field of Classification Search
CPC .................................................. H04L 43/0876
USPC .......................................................... 709/224
See application file for complete search history.

(56) References Cited

U.S. PATENT DOCUMENTS

| | | | |
|---|---|---|---|
| 5,802,309 A | 9/1998 | Cooke et al. | |
| 5,864,865 A | 1/1999 | Lakis | |
| 5,913,037 A | 6/1999 | Spofford et al. | |
| 6,176,883 B1 | 1/2001 | Holloway et al. | |
| 6,182,157 B1 | 1/2001 | Schlener et al. | |
| 6,574,662 B2 | 6/2003 | Sugiyama et al. | |
| 7,099,931 B2 | 8/2006 | Da Palma et al. | |
| 7,310,670 B1 | 12/2007 | Walbeck et al. | |
| 7,752,024 B2 | 7/2010 | Ball et al. | |
| 7,779,102 B2 | 8/2010 | Nogawa | |
| 2002/0049687 A1* | 4/2002 | Helsper et al. ................. 706/45 |
| 2003/0023605 A1 | 1/2003 | Sternin et al. | |
| 2003/0041134 A1 | 2/2003 | Sugiyama et al. | |
| 2003/0069963 A1 | 4/2003 | Jayant et al. | |
| 2005/0160163 A1* | 7/2005 | Nguyen et al. ............... 709/223 |
| 2005/0198238 A1 | 9/2005 | Sim et al. | |

(Continued)

OTHER PUBLICATIONS

Harrington et al., RFC 3411, "An Architecture for Describing Simple Network Management Protocol (SNMP) Management Frameworks," Network Working Group, the Internet Engineering Task Force draft, Dec. 2002, available at <http://tools.ietf.org/html/rfc3411>, 64 pp.

(Continued)

*Primary Examiner* — Bryan Lee
*Assistant Examiner* — Oluwatosin Gidado
(74) *Attorney, Agent, or Firm* — Shumaker & Sieffert, P.A.

(57) ABSTRACT

An example device includes a control unit that provides an execution environment for a network management application and a network interface. The network management application generates a request message based at least in part on a predicted amount of time required for the device to receive a response to a request message, wherein the predicted amount of time is based at least in part on object identifier processing time information, and wherein the predicted amount of time satisfies a timeout threshold. The network interface sends the request message and receives the response message. The network management application determines an amount of time that elapsed between when the device sent the request message and received the response message, and, responsive to determining that the amount of time that elapsed does not satisfy the timeout threshold, updates at least one of the object identifier processing time information and the timeout.

20 Claims, 6 Drawing Sheets

(56) References Cited

U.S. PATENT DOCUMENTS

| | | | |
|---|---|---|---|
| 2005/0228885 A1 | 10/2005 | Winfield et al. | |
| 2006/0190553 A1 | 8/2006 | Kojima | |
| 2006/0235971 A1 | 10/2006 | McCloghrie et al. | |
| 2007/0156711 A1 | 7/2007 | Yuengling et al. | |
| 2008/0043634 A1 | 2/2008 | Wang et al. | |
| 2008/0195745 A1 | 8/2008 | Bowra et al. | |
| 2008/0201468 A1* | 8/2008 | Titus | H04L 12/2602 709/224 |
| 2008/0235374 A1 | 9/2008 | Ikeda | |
| 2010/0023581 A1 | 1/2010 | Lahav | |
| 2010/0260066 A1 | 10/2010 | August et al. | |
| 2011/0040781 A1 | 2/2011 | Faulkner et al. | |
| 2011/0295989 A1 | 12/2011 | Kiyoto | |
| 2012/0083298 A1* | 4/2012 | Park | H04W 12/04 455/500 |
| 2012/0226798 A1* | 9/2012 | Krishna | H04L 41/0213 709/224 |
| 2014/0047000 A1* | 2/2014 | Zelek | H04L 41/0213 709/202 |
| 2014/0233514 A1* | 8/2014 | Lee | H04W 4/005 370/329 |

OTHER PUBLICATIONS

Godura et al., "Use of Control Variables to Convey Protocol Semantics in SNMP," Oct. 1995, IEEE, 11 pp.

Schonwalder et al. "SNMP Traffic Analysis: Approaches, Tools, and First Results", Computer Science, Jacobs University, Bremen, Campus Ring 1, 28759 Bremen, Germany, IEEE 2007, 10 pgs.

Sprenkels et al., "Bulk Transfers of MIB Data," Communication Systems Division (SSC) CH-1015 Lausanne, Switzerland, Mar. 1999, 11 pp., http://infoscience.epfl.ch/record/198/files/TR99_009.pdf.

Schonwalder, "Extending SNMP to Support Bulk MIB Data Transfers," presented on behalf of the Network Management Research Group (NMRG), Jul. 2000, 9 pp., http://www.irtf.org/charters/management.html.

Jagadish et al,. "Network Management Traffic Optimization," Proc. of 14th National Conf. on Communications, NCC-2008, IIT Bombay, Feb. 1-3, 2008, 5 pp.

Case et al., "Protocol Operations for version 2 of the Simple Network Management Protocol (SNMPv2)," RFC 1448, Apr. 1993, 36 pp.

McCloghrie et al., "Structure of Management Information Version 2 (SMIv2)," RFC 2578, Network Working Group, Apr. 1999, 43 pp.

McCloghrie et al., "Management Information Base for Network Management of TCP/IP-based internets: MIB-II," RFC 1213, Mar. 1991, 66 pp.

Guillebert "Advanced config questions about Event Translator and Varbind Filtering", available at http://opennms.530661.n2.nabble.com/Advanced-config-questions-about-Event-Translator-and-Varbind-Filtering-td5956145.html accessed Nov. 17, 2011, 9 pgs.

"OpenNMS" Event Configuration How-To-OpenNMS the OpenNMS Project, available at http://www.opennms.org/wiki/Event_Configuration_How-To, accessed Nov. 15, 2011, 17 pgs.

"[PATCH] Allow varbind filtering based on varbind OID instead of varbind number" OpenNMS, available at http://issues.opennms.org/browse/NMS-4377, accessed Nov. 17, 2011, 2 pgs.

Presuhn et al., "Version 2 of the Protocol Operations for the Simple Network Management Protocol (SNMP)," RFC 3416, Network Working Group, Dec. 2002, 31 pp.

U.S. Appl. No. 12/688,635, by Uday Kishore Kumbhari, filed Jan. 15, 2010.

U.S. Appl. No. 12/755,269, by Vivek Singh and Subodh Kumar, filed Apr. 6, 2010.

U.S. Appl. No. 13/183,198, by Vivek Singh, filed Jul. 14, 2011.

U.S. Appl. No. 13/411,248, by Vivek Singh, filed Mar. 2, 2012.

U.S. Appl. No. 13/533,753, by Gouri Sankar Singaraju, filed Jun. 26, 2012.

U.S. Appl. No. 12/970,509, by Gouri Sankar Singaraju, filed Dec. 16, 2010.

* cited by examiner

| Index | NMS | Timeout | Max_Proc_Time | Row_Status |
|---|---|---|---|---|
| 1 | 192.168.1.124 | 400 | 362 | Active |
| 2 | 192.168.1.232 | 400 | 354 | Active |
| 3 | 192.168.3.5 | 600 | 527 | Active |

FIG. 3A

| NMS_Index | Index | OID | Proc_Time | Error_Status |
|---|---|---|---|---|
| 1 | 1 | ifInErrors | 247 | FALSE |
| 1 | 2 | dot3adAggPortStatsIllegalRx | 324 | FALSE |
| 1 | 3 | ospfv3AreaScopeLsaCount | 550 | TRUE |
| 2 | 4 | ifInErrors | 286 | FALSE |
| 3 | 5 | dot3adAggPortStatsIllegalRx | 342 | FALSE |

VARIABLE TIMEOUTS FOR NETWORK DEVICE MANAGEMENT QUERIES

TECHNICAL FIELD

This disclosure relates to computer networks and, more particularly, to techniques for configuring and managing network devices.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. A variety of intermediate devices operate to route the packets between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, various clients, such as human users, automated scripts or network management systems, can perform configuration tasks as well as collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may receive information either by polling the managed device or by receiving asynchronous events from the devices. In this way, the management interfaces of the managed device may be used to access current operating parameters, system logs, information related to network connectivity, network activity or other status information for the devices, allowing clients to view and react to event information received from the devices.

The Simple Network Management Protocol (SNMP) is a standard defined by the Internet Engineering Task Force (IETF) for managing network devices. SNMP uses a design that incorporates one or more management information bases (MIBs) within a managed device to describe and expose internal data elements of the managed device. Management devices, such as computer consoles and network management systems, store data to and read data from the SNMP MIBs of the devices to configure, monitor and generally control operation of the devices. For example, an SNMP agent executing on the managed device accesses the device's internal SNMP MIBS and exchanges network management information with an SNMP manager running on the network management system or other host. The SNMP agent responds to requests for information and directives from the SNMP manager.

The SNMP standard defines several commands that an SNMP management application running on an SNMP management system must support for managing remote network devices. The SNMP management application issues the commands to an SNMP agent executing on the managed device. In version two of the SNMP standard, generally referred to as SNMPv2, these commands include Get, Get-Next, Set, and GetBulk. When issued by the SNMP management application, the Get and GetNext commands, for example, each retrieve a single scalar or tabular object from a MIB of the targeted network device.

The SNMP management system is configured to wait to receive a response to a command for up to a maximum amount of time. If the maximum amount of time elapses without the SNMP management system receiving a response, the SNMP management system typically resends the command to the SNMP agent. The SNMP management system may not receive the response quickly enough because the SNMP agent may be too slow or the response packet may have been dropped. In examples where the SNMP agent is too slow, the SNMP management system may subsequently receive a response to the initial command as well as a response to the resent command, which results in increased SNMP agent resource usage on the managed device as well as increased bandwidth usage. When the SNMP management system does not receive a response quickly enough, the SNMP management system is configured to increase the maximum amount of time to wait for the response. However, even if the SNMP agent is quick enough to provide a response within the increased amount of time, the increased amount of time causes additional delays when the packet is dropped.

SUMMARY

In general, techniques are described that enable a device management system to dynamically manage timeout thresholds for management requests on a per management agent and per variable basis. For example, rather than maintaining a single timeout across all management agents and all object identifiers (OIDs), the device management system may determine unique timeout thresholds for each management agent operating on one or more managed devices and for individual OID stored by the management agents. The unique timeout thresholds may be determined by a given device management system based on a variety of factors, such as network conditions (e.g., latency) and the amount of time it takes for the management agent on the managed device to process requests associated with each OID. Thus, rather than uniformly increasing the amount of time the device management system should wait before resending a request for all OIDs, which results in increased delay when a request or response packet is dropped, techniques of this disclosure enable the device management system to adjust the amount of time the device management system should wait before resending a request to an amount of time that is more commensurate with the time actually required for the management agent to process the particular OID and for the device management system to receive the response.

Further, techniques of this disclosure enable a device management system to dynamically generate request messages based on how long the management agent will likely take to process the request. The device management system may, for example, maintain information representative of how long, on average, each management agent takes to process OIDs and maintain specific information about how long each management agent takes for to process each OID for at least the OIDs that take longer than average. The device management system dynamically generates request messages based on how long it should take the management agent to process the request. If the amount of time is greater than the timeout threshold, the device management system changes one or more of the OIDs included in the request such that the anticipated amount of time from when the device management system sends the request until when the device management system receives the response is less than or equal to the timeout threshold.

Techniques of this disclosure may provide various advantages. For example, techniques described herein may reduce the frequency with which device management systems are required to resend commands to management agents. By dynamically adjusting timeout values on a per variable (e.g., SNMP OID) basis and by dynamically generating commands to include no more commands than can typically be performed by the management agent prior to the device management system timing out, the device management system will typically not timeout unless there is packet loss. In this manner, the amount of network bandwidth and the amount of management device resources used in response to device management system requests may be reduced.

In one embodiment, a method includes generating, with a device management system, a request message based at least in part on a predicted amount of time required for the device management system to receive a response to a request message, wherein the predicted amount of time is based at least in part on object identifier processing time information maintained by the device management system, and wherein the predicted amount of time satisfies a timeout threshold. The method may also include sending, with the device management system and to a management agent, the request message, and receiving, with the device management system, the response message from the management agent. The method may also include determining an amount of time that elapsed between when the device management system sent the request message and when the device management system received the response message, and, responsive to determining that the amount of time that elapsed does not satisfy the timeout threshold, updating at least one of the object identifier processing time information and the timeout threshold.

In another embodiment, network device includes a control unit that provides an execution environment for a network management application, a network interface, and a data repository configured to store the object identifier processing time information and the timeout threshold. The network management application is operable by the control unit to generate a request message based at least in part on a predicted amount of time required for the network management device to receive a response to a request message, wherein the predicted amount of time is based at least in part on object identifier processing time information maintained by the network management device, and wherein the predicted amount of time satisfies a timeout threshold. The network interface sends, to a management agent, the request message and receives, from the management agent, the response message. The network management application is further operable to determine an amount of time that elapsed between when the network management device sent the request message and when the network management device received the response message, and, responsive to determining that the amount of time that elapsed does not satisfy the timeout threshold, update at least one of the object identifier processing time information and the timeout threshold stored by the data repository.

In another embodiment, a computer-readable storage medium is encoded with instructions that cause one or more programmable processors of a network device to generate a request message based at least in part on a predicted amount of time required for the network management device to receive a response to a request message, wherein the predicted amount of time is based at least in part on object identifier processing time information maintained by the network management device, and wherein the predicted amount of time satisfies a timeout threshold. The instructions may also cause the one or more programmable processors to send, to a management agent, the request message, and receive the response message from the management agent. The instructions may also cause the one or more programmable processors to determine an amount of time that elapsed between when the network management device sent the request message and received the response message, and, responsive to determining that the amount of time that elapsed does not satisfy the timeout threshold, update at least one of the object identifier processing time information and the timeout threshold.

The details of one or more embodiments are set forth in the accompanying drawings and the description below. Other features, objects, and advantages will be apparent from the description and drawings, and from the claims.

DETAILED DESCRIPTION

Figure 1:
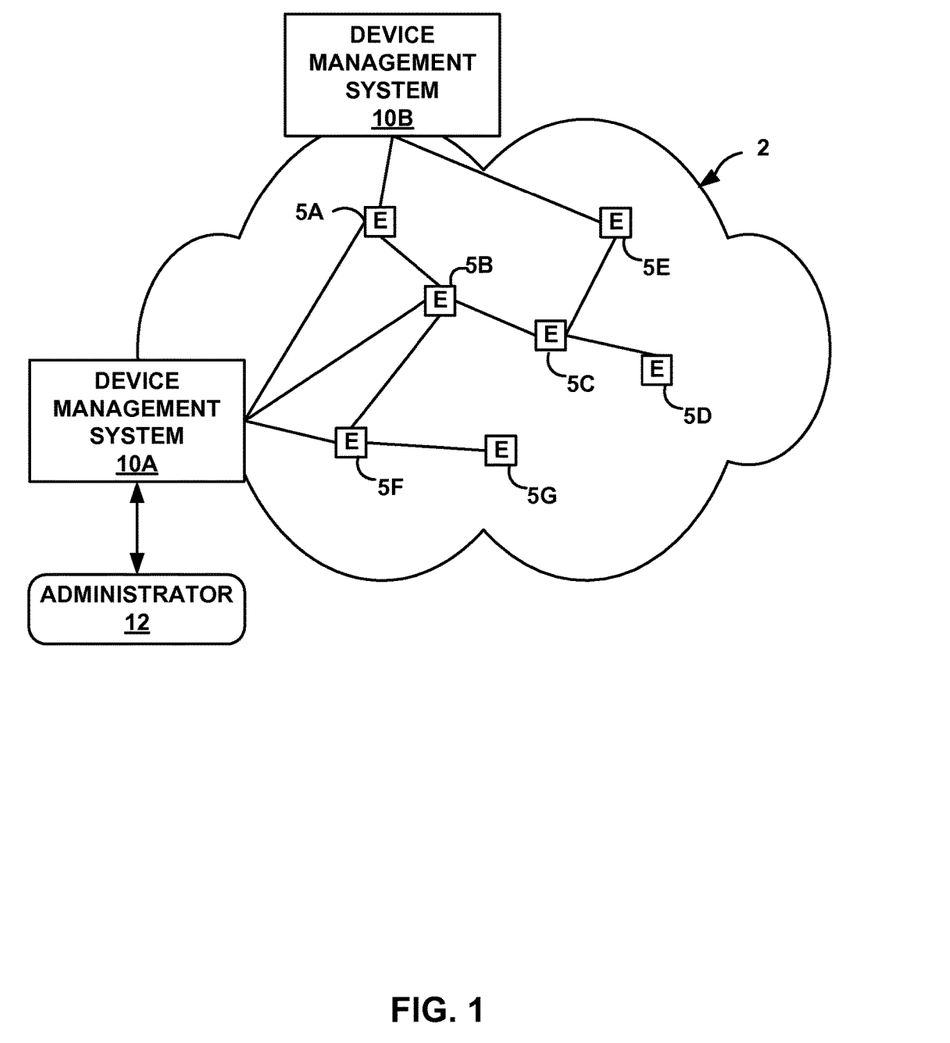
FIG. 1 is a block diagram illustrating elements of an example network that provides management data to device management systems in accordance with one or more aspects of this disclosure.

FIG. 1 is a block diagram illustrating elements of an example network 2 that provides management data to device management systems 10A and 10B in accordance with one or more aspects of this disclosure. Even though two device management systems 10A and 10B (collectively, "device management systems 10") are illustrated in FIG. 1, any number of device management systems 10 may be used to manage elements of enterprise network 2. Managed devices 5A-5G (collectively, "managed devices 5") of enterprise network 2 include network devices interconnected via communication links to form a communication topology in order to exchange resources and information. Even though seven managed devices 5 are illustrated in FIG. 1, any number of managed devices 5 may be included in enterprise network 2. Managed devices 5 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. Enterprise network 2 supports the exchange of protocol data units (PDUs) for transmitting data among managed devices 5 and device management systems 10. Such PDUs may comprise, for example, Internet Protocol (IP) packets Ethernet datagrams, and Asynchronous Transfer Mode (ATM) cells. Communication links interconnecting managed devices 5 may be physical links (e.g., optical, copper, and the like) or wireless.

Enterprise network 2 may represent an enterprise network, a campus network, a service provider network, or other autonomous system for example. Thus, while described with respect to an enterprise network, the techniques of this disclosure are applicable to other network types, public and private, including local area networks (LANs), virtual local area networks (VLANs), virtual private networks (VPNs), and the like. Enterprise network 2 may be coupled to one or more additional private or public networks, e.g., the Internet (not shown).

Device management systems 10 are communicatively coupled to managed devices 5 via enterprise network 2. Device management systems 10 may be coupled either directly or indirectly to the various managed devices 5. Once managed devices 5 are deployed and activated, administrator 12 may use device management systems 10 to manage the managed devices 5 using a management protocol designed for management of configuration data within managed devices 5, such as the Simple Network Management Protocol (SNMP), or the Network Configuration (NETCONF) protocol, or a derivative thereof, such as the Juniper Device Management Interface, to perform the configuration.

In common practice, device management systems 10 and managed devices 5 managed by device management systems 10 are centrally maintained by an IT group of the enterprise and are collectively referred to as an element management system (EMS) or a network management system (NMS). Administrator 12 interacts with one or more of device management systems 10 to remotely monitor and configure managed devices 5. For example, administrator 12 may receive alerts from device management system 10A regarding any of managed devices 5, view configuration data of managed devices 5, modify the respective configuration data of managed devices 5, add new network devices to network 2, remove existing network devices from network 2, or otherwise manipulate the network 2 and network devices therein.

Administrator 12 uses device management systems 10 to configure managed devices 5 to specify certain operational characteristics that further the objectives of administrator 12. For example, administrator 12 may specify for a managed device 5 a particular operational policy regarding security, device accessibility, traffic engineering, quality of service (QoS), network address translation (NAT), packet filtering, packet forwarding, rate limiting, or other policies. Device management systems 10 use a network management protocol, such as SNMP, designed for management of configuration data within network devices or monitoring and retrieving operation data from managed devices 5.

SNMP allows device management systems 10 to traverse and modify management information bases (MIBs) within each of devices 5 that describe the structure of the management data of the device by using a namespace that contains object identifiers (OIDs). Each OID represents, within the particular managed device 5, a managed object that identifies a specific characteristic about the managed device. Managed objects include one or more object instances, also represented by an OID in a MIB, that each identifies a variable of management data (e.g., a operational/configuration parameter) within the network device that can be read or set by the client via SNMP. Further details regarding SNMP can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which is incorporated herein by reference.

Device management systems 10 may issue commands in accordance with the network management protocol to monitor or control managed network devices 5 (e.g., SNMP GetRequest, GetNextRequest, Walk, or SetRequest commands). In an example operation, device management system 10A issues a command to direct an SNMP agent executing on one of devices 5 (e.g., device 5A) to retrieve a set of management information. The management information may include configuration and/or operational information. The command includes a request identifier that uniquely identifies that particular request associated with the command. Device 5A receives the request for the set of management information in the form of variable bindings ("varbinds"). The varbinds include a set of name-value pairs of management objects, where the name is the object identifier (OID). The SNMP agent executing on device 5A retrieves values for the set of requested OIDs and returns the OIDs and values in one or more response packet data units (PDUs). That is, the SNMP agent uses the OIDs to select object instances within the MIB, where each of the object instances is bound to a variable (e.g., a configurable parameter or status data unit) within the internal data space of the control software executing on the network device. In this way, the SNMP agent utilizes the structures in the MIB to allow device management system 10A to read or set any of the specific data elements of the internal data space that are described by the MIB and thereby exposed to the SNMP agent by way of the MIB.

In an example operation of a command and message exchange, a device management system 10, e.g., device management system 10A, issues a command to direct an SNMP agent executing on one of managed devices 5, e.g., device 5A, to retrieve a set of management information. The management information may include configuration and/or operational information. The command includes a request identifier that uniquely identifies that particular request associated with the command. Managed device 5A receives the request for the set of management information in the form of variable bindings ("varbinds"). The varbinds include a set of name-value pairs of management objects, where the name is the OID. The SNMP agent executing on managed device 5A retrieves values for the set of requested OIDs and returns the OIDs and values in one or more response PDUs. That is, the SNMP agent uses the OIDs to select object instances within the MIB, where each of the object instances is bound to a variable (e.g., a configurable parameter or status data unit) within the internal data space of the control software executing on the network device. In this way, the SNMP agent uses the structures in the MIB to allow device management systems 10 to read or set any of the specific data elements of the internal data space that are described by the MIB and thereby exposed to the SNMP agent by way of the MIB.

After the SNMP agent completes performing the actions specified by the command, the SNMP agent sends a response message to device management system 10A. However, device management system 10A may not receive the response message because, for example, the response message is dropped in the network. Similarly, if the command sent by device management system 10A is dropped during transit to managed device 5A, the SNMP agent may not receive the command. To account for the occasional network errors, device management system 10A is configured to maintain timeouts on a per variable (e.g., SNMP OID) basis. For example, each of device management systems 10 may store information about each of managed devices 5 and may, for each managed device 5, maintain a table of variable identifiers and a value indicating a processing time for the respective managed device 5 to process the particular OID requests. By maintaining per variable timeout information, device management systems 10 may maintain timeout values having an amount of time that is more commensurate with the time actually required for the management agent to process the particular OID and for the device management system to receive the response.

As one example of techniques of this disclosure, device management system 10A sends an SNMP query PDU for OID X1 to managed device 5A and starts a clock with a timeout of T1 seconds, which assumes that managed device 5A will take no more than $T_x$ time to process the response, wherein $T_x$ is T1 minus the round trip network delay. If managed device 5A is very slow, managed device 5A will not be able to process the request within the $T_x$ time limit. The delay will cause a timeout at device management system 10A and device management system 10A will retry the SNMP request. Managed device 5A may update an OID processing time table and send the response PDU for the original request to device management system 10A. Responsive to receiving the response PDU after the timeout, device management system 10A may poll the OID processing time table of managed device 5A and update a delay table of device management system 10A. Managed device 5A may also send the response PDU for the second request to device management system 10A. This second response PDU will be dropped by device management system 10A as device management system 10A has already received the response PDU and is not expected the additional response PDU with the same request identifier from managed device 5A.

The next time device management system 10A initiates an SNMP query for OID X1 and for managed device 5A, device management system 10A initiates a timer with a timeout value of T2 where T2 is greater than or equal to the processing time retrieved from the OID processing time table of managed device 5A, which is stored in the delay table of device management system 10A, plus the round trip network delay. With the updated timeout value, device management system 10A typically will not experience a timeout problem because of processing time taken by managed device 5A. However, device management system 10A may still experience a time out if the request or response PDU is dropped during transmission across the network.

Moreover, in some examples, device management systems 10 are configured to dynamically generate a request (e.g., query) that includes one or more requested variables such that the predicted time to process the query is less than a timeout value. In general, the timeout value corresponds to a maximum amount of time allowed to elapse between when a device management system 10 sends a request to when the device management system 10 receives a response. The timeout value may be a global timeout value (i.e., applicable to all managed devices 5) or a per managed device timeout value (e.g., managed device 5A has a first timeout value while managed device 5B has a second timeout value that may be different that the first timeout value). If the timeout value is not large enough to provide sufficient time for the particular managed device 5 to processes a request for a single OID, device management systems 10 are configured to increase the timeout value for the particular managed device 5. To facilitate generating queries that are predicted to require less than the threshold amount of time to process, device management system 10A may store the average amount of time required for managed device 5A to processing any single OID as well as the amount of time required for managed device 5A to process one or more OIDs determined to take longer than average to process. Using this OID processing time information, device management system 10A may identify one or more requested variables to include in the query such that the total of the predicted processing time of the included requested variables and the network delay is less than or equal to the amount of time specified by the timeout value.

In this manner, techniques of this disclosure may reduce the resources utilized by an SNMP agent by reducing the re-transmission frequency of SNMP request PDUs from the device management systems. As the re-transmission rate is reduced, the SNMP agent will also receive and process fewer duplicate request PDUs, thereby saving SNMP agent resources. Further, by reducing the re-transmission rate, fewer duplicate requests and responses are exchanged between the device management system and the SNMP agent, thereby reducing the amount of network bandwidth required to process the SNMP request PDUs.

Figure 2:
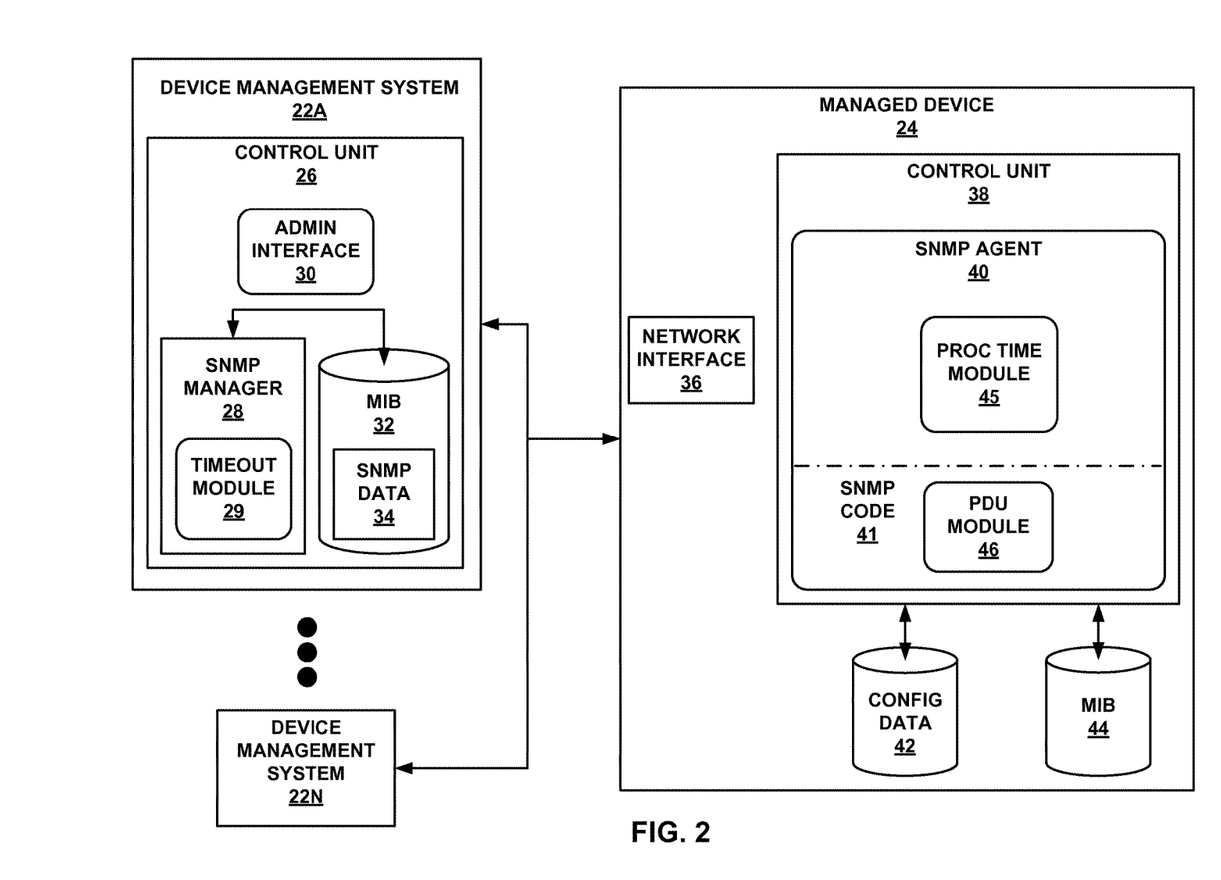
FIG. 2 is a block diagram illustrating an example set of network management devices and an example managed device configured to dynamically adjust SNMP request-response timeouts.

FIG. 2 is a block diagram illustrating an example set of network management devices that configure an example managed device to periodically provide specified management information in accordance with one or more aspects of this disclosure. Device management systems 22A-22N (collectively, "device management systems 22") manage managed device 24 using a management protocol, such as SNMP, for exchanging management protocol messages over a communication link. Device management systems 22 may also be referred to as network management devices in this disclosure. While described with respect to one particular protocol for managing network devices, e.g., SNMP, techniques of this disclosure may apply to any network management protocol by which a management application requests management information from a managed device and by which the managed device respond to the management information request by providing the management application with the requested management information.

Each of device management systems 22A-22N (collectively, "device management systems 22") may be an example of device management systems 10 of FIG. 1 and managed device 24 may be an example of a managed device 5 of FIG. 1. In the example embodiment illustrated in FIG. 2, device management system 22A includes control unit 26 and managed device 24 includes network interface 36 and control unit 38.

Each of control units 26 and 38 may include one or more processors that execute software instructions, such as those used to define a software or computer program, stored to a computer-readable storage medium, such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 38 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 26 provides an operating environment for SNMP manager 28, administrative interface (ADMIN INTERFACE) 30 and management information base (MIB) 32. MIB 32 is a hierarchy of information that specifies managed objects in device 24 managed by SNMP manager 28. MIB 32 includes managed object instances that each represent an aspect of SNMP managed data (SNMP DATA) 34, which may include, for example, configuration or descriptive data for device 24. In some examples, the current configuration of SMNP manager 28 may be contained in SNMP data 34. MIB 32 and SNMP data 34 may store timeout values for each OID registered with SNMP manager 28 as being stored by SNMP agent 40, as described in further detail with respect to FIGS. 4A-4B. MIB 32 and SNMP data 34 may each be stored in a data repository and stored in the form of one or more tables, databases, linked lists, radix trees, or other suitable data structure.

SNMP manager 28 represents an exemplary instance of an SNMP management application or, more generally, a network management application. SNMP manager 28 is one example of a network management module. In one example, SNMP manager 28 monitors and controls one or more of managed devices 5 of FIG. 1. As shown in FIG. 2, SNMP manager 28 includes timeout module 29, which manages timeouts for each OID registered with SNMP manager 28 as being stored by managed device 24. In general, when SNMP manager 28 sends a request message, timeout module 29 initiates a timer or otherwise determines an amount of time within which a response is to be received by SNMP manager 28 in order to prevent a timeout. In instances where the response is received within the amount of time, timeout module 29 stops monitoring the amount of time that has elapsed since the request was sent by SNMP manager 28. In instances where the response is not received by device management system 22A within the amount of time (i.e., prior to the amount of time specified by a timeout value elapsing since the request message was sent by SNMP manager 28), SNMP manager 28 may re-send the request and timeout module 29 may adjust the timeout value (e.g., by increasing the timeout value to allow more time to elapse before triggering a timeout condition). The timeout value may be a value that is configured by a user, by timeout module 29, by a process or application executing at device management system 22A, or by any other mechanism. Increasing the timeout value may allow SNMP agent 40 of managed device 24 to take more time to process the request and send the response to device management system 22A.

In some examples, timeout module 29 may be configured to determine whether SNMP manager 28 received any response to the request, regardless of whether it was received before timing out. Based on whether a response was received at all, timeout module 29 may selectively adjust the timeout value. For example, if SNMP manager 28 did not receive a response, timeout module 29 may determine that either the request or response was dropped during transmission. In this example, timeout module 29 may determine that the timeout value does not need to be adjusted and will refrain from changing the timeout value. In another example, if SNMP manager 28 receives a response after the requested timed out, timeout module 29 may determine how long after the timeout SNMP manager 28 received the response and adjust the timeout value accordingly. That is, timeout module 29 may determine the amount of time that elapsed between SNMP manager 28 sending the request and receiving the response and adjust the timeout value such that the timeout value is equal to or greater than amount of time that elapsed between SNMP manager 28 sending the request and receiving the response. In some examples, timeout module 29 may determine an amount of network delay (e.g., the amount of time it takes for the request and response to travel between device management system 22A and managed device 24) and adjust the timeout value based on the network delay (e.g., by setting the timeout value to the amount of time equal to the total amount of time that elapsed minus the network delay).

Device 24 may be any device having one or more processors and a memory, and that is capable of executing one or more software processes, including SNMP agent 40, that operates in accordance with a network management protocol, such as SNMP. Device 24 stores objects that represent device 24 resources in a structured form within MIB 44. Each object is identifiable by a unique object identifier. The specific characteristics, or "managed objects," of device 24 typically include resources, parameters, settings, or descriptors for a component, software objects' attributes, system attributes, or global data, for instance. Examples of managed objects include network interfaces of device 24, data describing the relationships between multiple sub-layers of network interfaces, and data describing and providing status information for IEEE 802.3 Medium Attachment Units (MAUs). MIB 44 may be stored in a data repository and may store objects in the form of one or more tables, databases, linked lists, radix trees, or other suitable data structure.

A network operator or other administrator interacts with administrative interface 30 to direct SNMP manager 28 to manage device 24 in a specified manner, e.g., to modify the configuration of device 24 or to monitor the status or performance of device 24, by requesting variable information available from device 24 according to MIB 32. For example, the operator may enter commands to view and modify SNMP data 34 and ultimately to deploy the configuration data to MIB 44 of device 24 as operational configuration data of the device. As another example, the operator may enter commands to retrieve the operational data from MIB 44 of device 24. In another example, SNMP manager 28 may be configured to automatically check the configuration or the status of device 24 or monitor the performance of device 24 at specified times, e.g. once every two minutes or once per month. The status of device 24 may include one of up, down, or warning. When checking the performance of device 24, SNMP manager 28 may retrieve information about network latency, traffic load, errors, central processing unit load, memory usage, and the like.

Control unit 38 of device 24 provides an operating environment for SNMP agent 40, configuration data (CONFIG DATA) 42, and MIB 44. Device 24 stores management data in a structured form, such as MIB 44. Configuration data 42 and MIB 44 may each be stored in a data repository and may each store data in the form of one or more tables, databases, linked lists, radix trees, or other suitable data structure. In some examples, configuration data 42 may be included within MIB 44 and may include tables or other data structures that conform to the structure of MIB 44, thereby minimizing the changes required to implement the techniques of this disclosure and increasing the ease with which the techniques of this disclosure may be deployed. Either or both of configuration data 42 and MIB 44 may store timeout values and processing times for each OID managed by SNMP agent 40, as described in further detail with respect to FIGS. 3A-3B.

SNMP agent 40 may operate as a software daemon executing within control unit 38. More specifically, SNMP agent 40, as shown in FIG. 2, includes long-standing SNMP program code 41 and processing time module (PROC TIME MODULE) 45. Long-standing program SNMP code 41 includes PDU module 46, which is configured to generate response messages in response to receiving the request message from device management system 22A. In general, processing time module 45 determines the amount of time required for SNMP agent 40 to receive a request, generate a response, and send the response. That is, processing time module 45 may calculate the amount of time that elapses between when the request is received by SNMP agent 40 until when the response is sent by SNMP agent 40.

In one example, processing time module 45 may determine the amount of time required to process the request for a given OID by initiating a timer in response to SNMP agent 40 receiving a request for the OID and stopping the time in response to SNMP agent 40 sending the response. In another example, processing time module 45 may determine the amount of time required to process the request for an OID by storing a time at which SNMP agent 40 receives a request for the OID, storing a time at which SNMP agent 40 sends the response, and determining the amount of time that elapsed between the two times.

In examples where the request is a request for multiple OIDs, processing time module 45 may also determine the amount of time required to process each of the OIDs included in the request by, for example, maintaining separate timers for each OID. Processing time module 45 may start the respective OID timer when SNMP agent 40 begins processing the particular OID (e.g., when SNMP agent 40 extracts the requested variable information from the request message) and may stop the respective OID timer when the OID information is received from MIB 44 or when the OID information is included in a response packet. By maintaining separate timers for each OID, processing time module 45 may identify any OIDs that require longer than average to process. Other examples of how processing time module 45 may determine the amount of time required by SNMP agent 40 to process the request for a given OID are contemplated and techniques of this disclosure are not intended to be limited to just the two examples provided above. In general, processing time module 45 stores the determined processing time within either or both of configuration data 42 and MIB 44.

Figure 3A:
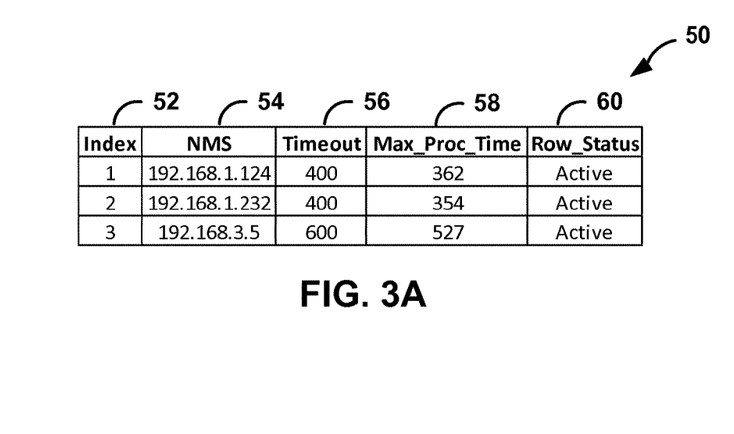
FIGS. 3A-3B are example configuration tables that may be stored by a managed network device in accordance with one or more aspects of this disclosure.
Figure 3B:
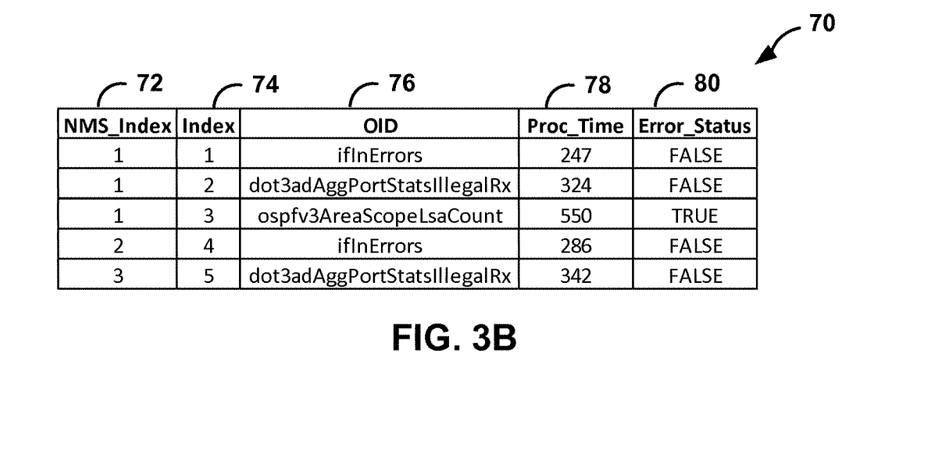

FIGS. 3A-3B are example configuration tables that may be stored by a managed network device in accordance with one or more aspects of this disclosure. Tables 50, 70 may be included within configuration data 42 or MIB 44 of managed device 24 shown in FIG. 2. While illustrated and described as tables, tables 50, 70 may be implemented as object trees or other data structures. Tables 50, 70 may, therefore, include conceptual rows (as illustrated) rather than actual rows. For purposes of illustration, FIGS. 3A-B is described below with respect to device management systems 22 and managed device 24 of FIG. 2.

Tables 50, 70 may be used by SNMP agent 40 when registering with device management system 22A or when executing SNMP requests received by managed device 24, as non-limiting examples. NMSTimeout table 50 is one example of a table configured to store timeout and maximum processing time information on a per device management system basis for each device management system with which managed device 24 is registered. NMSTimeout table 50 includes index column 52, network management system (NMS) column 54, timeout column 56, maximum processing time column 58, and row status column 60. Index column 52 stores unique values that are used as a row index for NMSTimeout table 50. NMS column 54 is configured to store the Internet protocol (IP) address for each device management system with which managed device 24 is registered. Timeout column 56 stores the default timeout value for the corresponding device management system. Maximum processing time column 58 stores the maximum amount of time required to process any request from the corresponding device management system. In some examples, the maximum processing time includes the network delay as determined by managed device 24 using, e.g., traceroute, ping, or other techniques known in the art. Row status column 60 stores values that are used for addition and deletion of the corresponding row.

OIDProcessingTime table 70 is one example of table configured to store processing time information on a per OID basis for OIDs that take longer than an average amount of processing time to process. In some examples, the average processing time for the OIDs may be stored by managed device 24 in an AverageProcessingTime.0 scalar variable. OIDProcessingTime table 70 includes network management system index column 72, index column 74, OID column 76, processing time column 78, and error status column 80. NMS index column 72 stores a foreign key that corresponds to the index column of table 50. Index column 74 stores unique values that are used as a row index for table 70. OID column 76 stores the name of the object identifier. Processing time column 78 stores the amount of time required to process the corresponding OID (i.e., the OID specified in OID column 76 for the particular row). Error status column 80 stores an error status that is used as a flag to indicate if there is a problem with the particular managed resource (e.g., the corresponding OID).

Figure 4A:
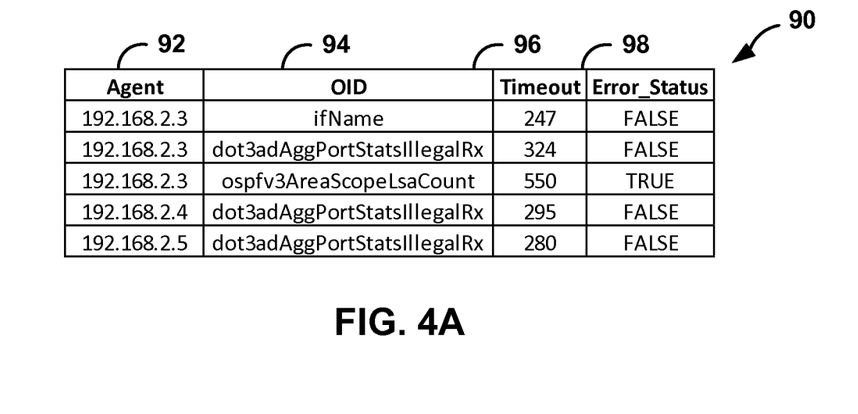
FIGS. 4A-4B are example configuration tables that may be stored by a device management system in accordance with one or more aspects of this disclosure.
Figure 4B:
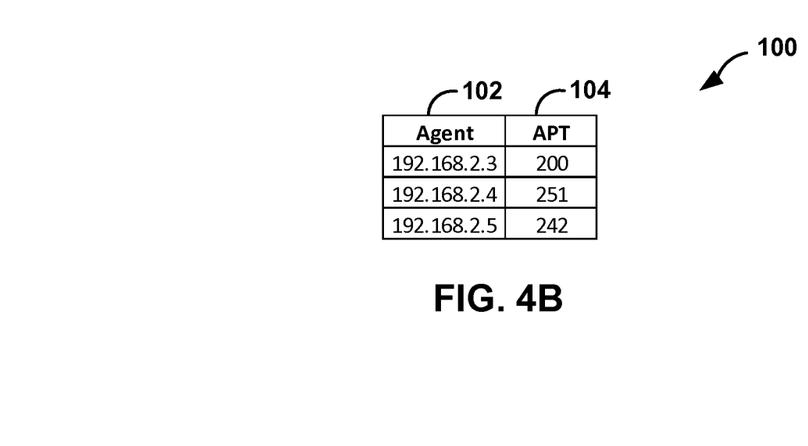

FIGS. 4A-4B are example configuration tables that may be stored by a device management system in accordance with one or more aspects of this disclosure. Tables 90, 100 may be included within MIB 32 of device management system 22A shown in FIG. 2. While illustrated and described as tables, tables 90, 100 may be implemented as object trees or other data structures. Tables 90, 100 may, therefore, include conceptual rows (as illustrated) rather than actual rows. For purposes of illustration, FIGS. 4A-4B are described below with respect to device management systems 22 and managed device 24 of FIG. 2.

Tables 90, 100 may be used by SNMP manager 28 when registering managed device 24 or when generating SNMP requests, as non-limiting examples. Delay table 90 is one example of a table configured to store timeout values and error information on a per OID basis. Delay table 90 includes agent column 92, OID column 94, timeout column 96, and error status column 98. Agent column 92 stores the IP address of each managed device registered with device management system 22A. OID column 94 stores the name of the object identifier. Timeout column 96 stores the timeout value for the corresponding OID. Error status column 98 indicates the status of the corresponding OID. In one example, if the value stored by error status column 98 is "true", there is a problem with the corresponding OID and device management system 22A typically is configured not to include the OID in a request.

AgentProcessingTime table 100 is one example of a table configured to store average processing time information on a per SNMP agent basis. AgentProcessingTime table 100 includes agent column 102, and average processing time (APT) column 104. Agent column 102 stores the IP address of each managed device registered with device management system 22A. APT column 104 stores the average amount of time it takes for the corresponding SNMP agent to process a single OID.

In one example operation, managed device 24 is added to a network and registers with device management system 22A through a discovery process. The discovery process includes an exchange of information between device management system 22A and managed device 24. In one example, SNMP agent 40 of managed device 24 sends information about the OIDs maintained by managed device 24, the average amount of time it takes managed device 24 to process an OID, and the IP address of managed device 24. SNMP manager 28 of device management system 22A sends the default timeout value used by device management system 22A and the IP address of device management system 22A. SNMP agent 40 creates a new row within NMSTimeout table 50 and stores the IP address of device management system 22A within NMS column 54 and the default timeout value specified by device management system 22A within timeout column 56. SNMP manager 28 creates a new row within AgentProcessingTime table 100 and stores the IP address of managed device within agent column 102 and the average processing time within APT 104. In another example, device management system 22A polls for the AverageProcessingTime.0 scalar variable and updates AgentProcessingTime table 100. Device management system 22A may further poll managed device 24 for the information stored in OIDProcessingTime table 70 and may update delay table 90 if any entry is present in OIDProcesssingTime table 70 for device management system 22A. Device management system 22A may also create a row in NMSTimeout table 50 and update the default timeout and the IP address in the created row.

In instances where device management system 22A is already registered with managed device 24, SNMP agent 40 does not create a new row within NMSTimeout table 50, but may update the default timeout value stored in timeout column 56 at the row of NMSTimeout table 50 that includes the IP address of device management system 22A within NMS column 54. Similarly, in instances where managed device 24 is already registered with device management system 22A, SNMP manager 28 does not create a new row within AgentProcessingTime table 100, but may update the average processing time stored in APT column 104 at the row of AgentProcessingTime table 100 that includes the IP address of managed device 24 within agent column 102.

Once the discovery processes is complete, SNMP manager 28 may generate and send requests to managed device 24. In general, SNMP manager 28 generates requests such that the predicted amount of time required to receive the response from managed device 24 is less than the default timeout value for managed device 24. For example, SNMP manager 28 can build a request or query PDU using the following formula: $N_A*APT+(T_{OID1}+T_{OID2}+\ldots+TN_D)+$ networkDelay<Timeout where $N_T$ is the total number of variables present in the request PDU varbind, $N_D$ is the number of OIDs present in the varbind which are listed in the delay table, $N_A$ is $N_T-N_D$ and $T_{OIDn}$ is the time specified for the OID in the delay table. When generating the request, SNMP manager 28 queries AgentProcessingTime table 100 to retrieve the average OID processing time for managed device 24. SNMP manager 28 may also query delay table 90 to determine if there are any OIDs that have been included in requests that caused a timeout. Device management system 22A may determine the network delay by, for example, executing a ping or traceroute command to determine the amount of time required for a packet to travel from device management system 22A to managed device 24 and back to device management system 22A. SNMP manager 28 identifies the variables that may be included in the request such that the request is predicted not to cause a timeout condition and generates the request to include a request for those variables.

SNMP manager 28 sends the generated request to managed device 24. SNMP agent 40 of Managed device 24 processes the request and generates a response based on the request. When generating the response, processing time module 45 determines how long it takes SNMP agent 40 to process each OID. For each OID that takes longer than the average processing time, processing time module 45 creates or updates an entry within OIDProcessingTime table 70 for the OID that includes the amount of time it took SNMP agent 40 to process the OID. Once all of the OIDs are processed, SNMP agent 40 assembles the response and sends the response to device management system 22A.

SNMP agent 40 may also determine the network delay and store the value for the network delay associated with device management system 22A within maximum processing time column 58. The maximum processing time is equal to the timeout value for device management system 22A minus the network delay. If the average processing time for the request variables is greater than the maximum processing time, SNMP agent 40 may be configured to send a trap containing the average processing time for the requested variables to SNMP manager 28. After receiving the trap, SNMP manager 28 typically increases the timeout value for SNMP agent 40 and sends a command to SNMP agent 40 to update the timeout value stored in timeout column 56 of NMSTimeout table 50 to the new timeout value.

If SNMP manager 28 does not receive the response from SNMP agent 40 before the request times out, SNMP manager 28 may generate and send a second request. The second request may include the same variables as were included in the original request or may include different variables predicted by timeout module 29 to require less time to process. For example, the second request may include a request for fewer variables than were included in the original request. In instances where an earlier request for the same variables did not timeout, SNMP manager 28 and timeout module 29 may determine that the network dropped either the request or the response during transmission and generate a new request that includes the same variables as the original request.

If SNMP manager 28 does not receive the response from SNMP agent 40 before the request times out but does receive a response at some point (i.e., the network did not drop the request or response), SNMP manager 28 may also query SNMP agent 40 for additional processing time information. For example, SNMP manager 29 may send a request to SNMP agent 40 that includes a request for information stored in OIDProcessingTime table 70. Typically, one or more of the variables included in the original request that timed out will have a corresponding entry within the OIDProcessingTime table 70 because at least one of the variables should have taken longer than average to process or else the response would have been received prior to the request timing out. Responsive to receiving the processing time information for the variables having entries in OIDProcessingTime table 70, timeout module 29 creates and/or updates, based on the received processing time information, the processing time information (i.e., timeout column 96) for the variables stored within delay table 90. That is, in examples where a response is received after a timeout, SNMP manager 28 may query SNMP agent 40 for processing time information and update stored processing time information for one or more OIDs, which, in turn, may be used when generating other queries so as to avoid future requests from timing out.

Figure 5:
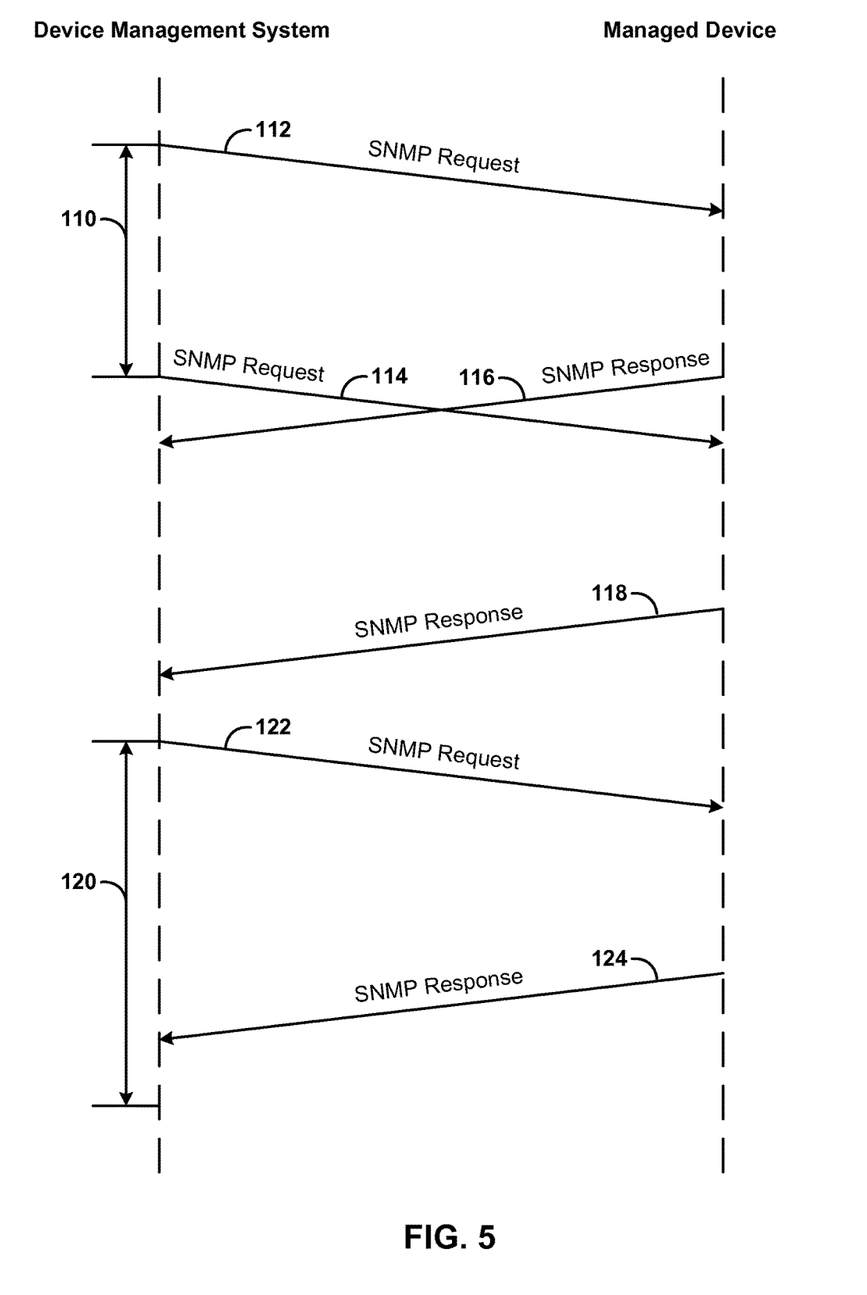
FIG. 5 is a conceptual diagram illustration an example message exchange that includes a dynamic timeout adjustment in accordance with one or more aspects of this disclosure.

FIG. 5 is a conceptual diagram illustration an example message exchange that includes a dynamic timeout adjustment in accordance with one or more aspects of this disclosure. For purposes of clarity, the example message exchange shown in FIG. 5 will be described with respect to device management system 22A and device 24 shown in FIG. 2.

In the example message exchange shown in FIG. 5, device management system 22A is configured with a timeout value for managed device 24 corresponding to time span 110. The timeout value may be a default timeout value or a previously adjusted timeout value. Device management system 22A sends SNMP request 112 to managed device 24. As soon as SNMP request 112 is sent, timeout module 29 imitates a clock with a timeout equal to the amount of time specified by the timeout value and shown by time span 110. The timeout value is set such that device management system 22A should receive a response from managed device 24 prior to the request timing out and assumes that managed device 24 will take no more time to process the request than the timeout value minus the network delay.

As shown in FIG. 5, SNMP response 116 is not received prior to SNMP request 112 timing out (i.e., because SNMP manager 28 does not receive SNMP response 116 prior to the termination of time span 110). As previously discussed, processing time module 45 of SNMP agent 40 determines that one or more of the OIDs required greater than the average processing time to process. Processing time module 45 updates OIDProcessingTime table 70 with the amount of time required to process each OID that took longer than average to process. Because SNMP response 116 is not received prior to SNMP request 112 timing out, SNMP manager 28 generates a second SNMP request, SNMP request 114, which has the same request ID as SNMP request 112. Responsive to receiving SNMP response 116 after SNMP request 112 timed out, SNMP manager 28 determines that the timeout value needs to be increased. SNMP manager 28 queries OIDProcessingTime table 70 to determine which OIDs required longer than average to process and updates delay table 90 with the processing time required to process the OIDs. SNMP manager 28 increases the timeout value by an amount corresponding to the increased amount of time required for SNMP agent 40 to process the request. That is, instead of arbitrarily increasing the timeout value by some pre-configured amount, techniques of this disclosure enable SNMP manager 28 to increase the timeout value only as much as is required SNMP manager 28 to receive a response without timing out. SNMP manager 28 also receives SNMP response 118, but discards the response because SNMP manager 28 already received a response for the request ID included in SNMP response 118.

At a later time, SNMP manager 28 generates and sends SNMP request 122 that includes a request for the same variables as SNMP requests 112 and 114. However, as SNMP manager 28 has adjusted the time out value based on the earlier SNMP requests and responses to be time span 120, SNMP manager 28 receives SNMP response 124 prior to SNMP request 122 timing out, thereby eliminating the generating of a duplicate SNMP request without excessively increasing the timeout value. In this manner, even if the network drops a request or response, SNMP manager 28 only waits for the minimal amount of time required to receive the response from SNMP agent 40 had the network not dropped the request or response.

Figure 6:
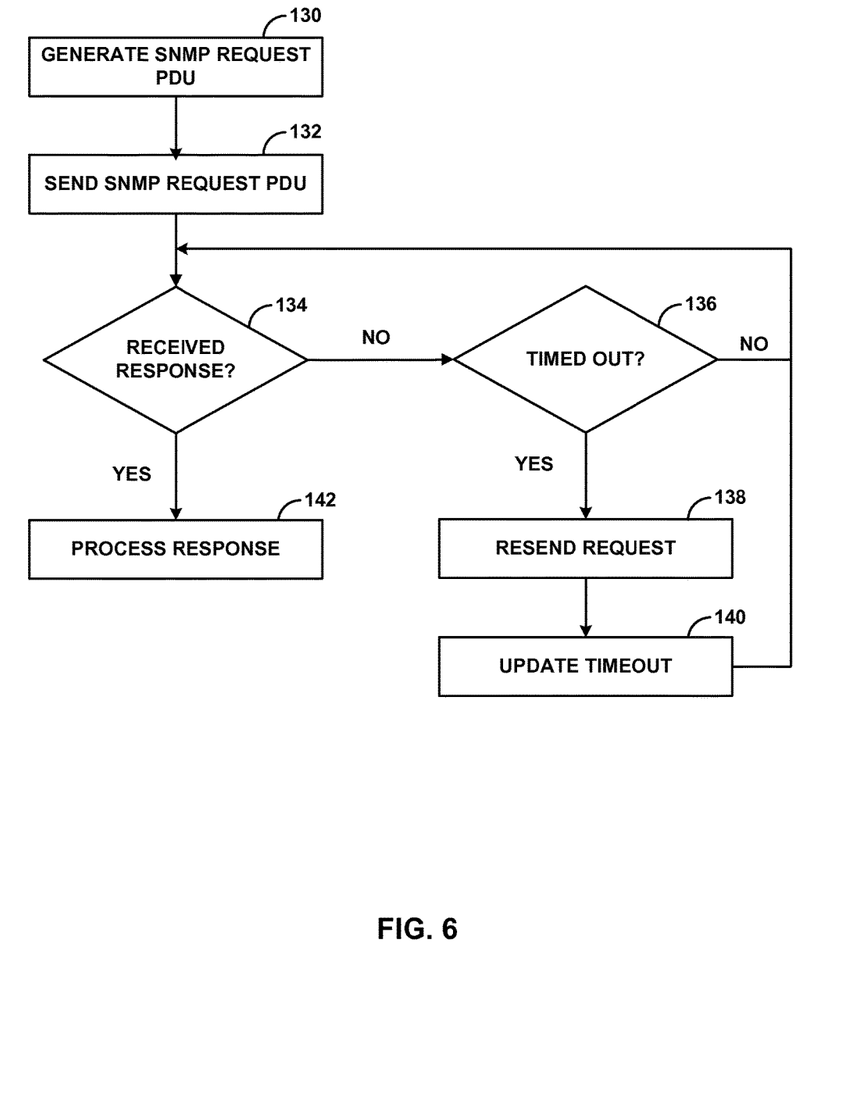
FIG. 6 is a flowchart illustrating an example process for dynamically adjusting timeouts in accordance with one or more aspects of this disclosure.

FIG. 6 is a flowchart illustrating an example process for dynamically adjusting timeouts in accordance with one or more aspects of this disclosure. For purposes of clarity, the process shown in FIG. 6 will be described with respect to device management system 22A and device 24 shown in FIG. 2. In some examples, one or more steps of the process of FIG. 6 may be optional and the steps of the process may be performed in a different order.

Device management system 22A generates an SNMP request PDU (i.e., a query) for sending to managed device 24 (130). In generating the request, device management system 22A uses information stored in MIB 32 to build a request that is predicted not to cause a timeout condition. For example, SNMP manager 28 retrieves OID processing time information from delay table 90 (FIG. 4A) and AgentProcessingTime table 100 (FIG. 4B). The processing time information includes the average amount of time required by SNMP agent 40 of managed device 24 to process an OID as well as processing time information for any requested OIDs that require more than the average amount of time for SNMP agent 40 to process.

Using the retrieved processing time information, device management system 22A calculates the predicted amount of time required for device management system 22A to receive a response from managed device 24 (i.e., the total time required for the request to reach managed device 24, for managed device 24 to process the request and generate the response, and for the response to reach device management system 22A). The predicted amount of time includes the network delay as well as the predicted amount of time required for SNMP agent 40 to process the requested variables. If the predicted amount of time required is greater than the timeout value, SNMP manager 28 may change the variables included in the request such that the predicted amount of time required is less than the timeout value. That is, in some examples, SNMP manager 28 may split a request into two or more different requests such that each of the two or more different requests is predicted to require less time than is specified by the timeout value.

Device management system 22A sends the request to managed device 24 (132) and timeout module 29 initiates a clock to determine whether the request has timed out. SNMP manager 28 determines whether a response is received from managed device 24 (134). If a response is not received ("NO" branch of 134), timeout module 29 determines whether the request has timed out (136). If the request has not timed out ("NO" branch of 136), SNMP manager 28 and timeout module 29 continue to monitor for a response and a timeout condition.

If the response times out ("YES" branch of 136), SNMP manager 28 resends the request (138) and timeout module 29 updates the timeout value for the requested OIDs and/or for managed device 24 (140). SNMP manager updated the timeout values by, for example, polling OIDProcessingTime table 70 to retrieve updated processing time information for any of the requested OIDs that required longer than the average processing time for SNMP agent 40 to process as well as the AverageProcessingTime.0 scalar variable. Based on the retrieved processing time information, SNMP manager 28 updates delay table 90 to include the processing time required by SNMP agent 40 to processes each OID that required longer than the average processing time for SNMP agent 40 to process and agentProcessingTime table 100. If device management system 22A receives a response from managed device 24 ("YES" branch of 134), SNMP manager 28 processes the response (142).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments have been described. These and other embodiments are within the scope of the following claims.

What is claimed is:

1. A method comprising:
    storing, with a device management system and in a data repository of the device management system, object identifier processing time information including an amount of time required for a management agent executing on a managed device to process one or more object identifiers, wherein each of the one or more object identifiers identifies respective information stored by the managed device;
    identifying, with the device management system, a set of requested object identifiers such that a predicted amount of time required for the device management system to receive a response to a request message that includes a request for the requested set of object identifiers satisfies a timeout threshold, wherein the predicted amount of time required for the device management system to receive the response to the request message is based at least in part on the amount of time required for the management agent to process the one or more object identifiers stored by the device management system;
    generating, with the device management system, the request message including the set of requested object identifiers,
    sending, with the device management system and to a management agent, the request message;
    receiving, with the device management system, a response message from the management agent;
    determining an amount of time that elapsed between when the device management system sent the request message and when the device management system received the response message; and
    responsive to determining that the amount of time that elapsed does not satisfy the timeout threshold, updating, with the device management system, at least one of the object identifier processing time information and the timeout threshold.

2. The method of claim 1, wherein updating at least one of the object identifier processing time information and the timeout threshold comprises:
    sending, with the device management system and to the management agent, a request for updated object identifier processing time information;
    receiving, with the device management system and from the management agent, the updated object identifier processing time information for each of a plurality of object identifiers stored by the managed device that requires greater than an average amount of processing time for the management agent to process; and
    updating, with the device management system, the data repository to include the updated object identifier processing time information for each of the plurality of object identifiers that require greater than an average amount of processing time for the management agent to process.

3. The method of claim 1, wherein identifying the set of requested object identifiers further comprises:
    determining, by the device management system and based on the object identifier processing time information stored by the device management system, a predicted amount of time required for the management agent to process the set of one or more requested object identifiers;
    determining, by the device management system, a predicted network delay, wherein the network delay includes an amount of time required for the request message to travel over a network from the device management system to the management agent and an amount of time required for the response message to travel over the network from the management agent to the device management system; and
    determining, with the device management system, the predicted amount of time required for the device management system to receive a response to the request message based at least in part on the predicted amount of time required for the management agent to process the set of requested object identifiers and the predicted network delay.

4. The method of claim 3, wherein determining the predicted amount of time required for the management agent to process the set of requested object identifiers comprises:
    retrieving, from a data repository of the device management system, an average amount of time required for the management agent to process one object identifier;
    retrieving, from the data repository, a respective amount of time required to process each object identifier that previously required greater than the average amount of time for the management agent to process; and
    calculating, by the device management system, the predicted of time required for the management agent to process the set of requested object identifiers based at least in part on the average amount of time required for the management agent to process one object identifier and the respective amount of time required to process each object identifier that previously required greater than the average amount of time for the management agent to process.

5. The method of claim 3,
wherein identifying the set of object identifiers further comprises, prior to generating the request message and responsive to determining that the predicted amount of time required for the device management system to receive the response to the request message does not satisfy the timeout threshold, determining, with the device management system, a portion of the set of requested object identifiers such that the portion of the set of requested object identifiers is predicted to require an amount of time to process that is less than or equal to the amount of time of the timeout threshold minus the amount of time of the predicted network delay, and
wherein generating the request message comprises generating the request message based on the portion of the set of requested object identifiers.

6. The method of claim 1, wherein the request message includes a request for one object identifier, the method further comprising:
responsive to determining that the amount of time that elapsed does not satisfy the timeout threshold, updating the timeout threshold based on the amount of time that elapsed.

7. The method of claim 1, further comprising:
sending, from the device management system and to the management agent, an indication of the timeout threshold;
receiving, from the management agent, a trap message that includes an average amount of time required for the management agent to process one object identifier, wherein the management agent sends the trap message in response to determining that the average amount of time required for the management agent to process one object identifier is greater than the timeout threshold; and
updating, with the device management system, the timeout threshold based on the average amount of time required for the management agent to process one object identifier.

8. The method of claim 1, further comprising:
determining, with the device management system, that the response message indicates an error condition for at least one object identifier included in the request message;
updating, with the device management system, the data repository of the device management system to indicate the error condition for the at least one object identifier.

9. The method of claim 8, further comprising:
determining whether one or more requested object identifiers are associated with an error condition by at least querying the data repository; and
responsive to determining that at least one of the one or more requested object identifiers is associated with the error condition, generating a second request message that does not include the at least one of the one or more requested object identifiers associated with the error condition.

10. A network management device comprising:
a data repository configured to store object identifier processing time information and a timeout threshold, wherein the object identifier processing time information includes an amount of time required for a management agent executing on a managed device to process one or more object identifiers, and wherein each of the one or more object identifiers identifies respective information stored by the managed device;
a control unit that provides an execution environment for a network management application, wherein the network management application is operable by the control unit to identify a set of requested object identifiers such that a predicted amount of time required for the network management device to receive a response to a request message that includes a request for the requested set of object identifiers satisfies a timeout threshold, wherein the predicted amount of time required for the network management device to receive the response to the request message is based at least in part on the amount of time required for the management agent to process the one or more object identifiers stored by the device management system and generate the request message including the set of requested object identifiers; and
a network interface to send, to a management agent, the request message and receive, from the management agent, a response message,
wherein the network management application is further operable to determine an amount of time that elapsed between when the network management device sent the request message and when the network management device received the response message, and, responsive to determining that the amount of time that elapsed does not satisfy the timeout threshold, update at least one of the object identifier processing time information and the timeout threshold stored by the data repository.

11. The network management device of claim 10,
wherein the network interface sends, to the management agent, a request for updated object identifier processing time information, and receives, from the management agent, the updated object identifier processing time information for each of a plurality of object identifiers stored by the managed device that requires greater than an average amount of processing time for the management agent to process, and
wherein the network management application is further operable to update the data repository to include the updated object identifier processing time information for each of the plurality of object identifiers that require greater than an average amount of processing time for the management agent to process.

12. The network management device of claim 10, wherein the network management application is further operable to determine, based on the object identifier processing time information, a predicted amount of time required for the management agent to process the set of requested object identifiers, determine a predicted network delay, wherein the network delay includes an amount of time required for the request message to travel over a network from the network management device to the management agent and an amount of time required for the response message to travel over the network from the management agent to the network management device, and determine the predicted amount of time required for the network management device to receive a response to the request message based at least in part on the predicted amount of time required for the management agent to process the set of requested object identifiers and the predicted network delay.

13. The network management device of claim 12, wherein the network management application is further operable to receive, from the data repository, an average amount of time required for the management agent to process one object identifier, receive, from the data repository, a respective amount of time required to process each object identifier that previously required greater than the average amount of time for the management agent to process, and calculate the predicted of time required for the management agent to process the set of requested object identifiers based at least in part on the average amount of time required for the management agent to process one object identifier and the respective amount of time required to process each object identifier that previously required greater than the average amount of time for the management agent to process.

14. The network management device of claim 12, wherein the network management application is further operable to, prior to generating the request message and responsive to determining that the predicted amount of time required for the network management device to receive the response to the request message does not satisfy the timeout threshold, determine a portion of the set of requested object identifiers such that the portion of the set of requested object identifiers is predicted to require an amount of time to process that is less than or equal to the amount of time of the timeout threshold minus the amount of time of the predicted network delay, and
wherein the network management application generates the request message by at least generating the request message based on the portion of the set of requested object identifiers.

15. The network management device of claim 10,
wherein the request message includes a request for one object identifier, and
wherein the network management application is further operable to, responsive to determining that the amount of time that elapsed does not satisfy the timeout threshold, update the timeout threshold based on the amount of time that elapsed.

16. The network management device of claim 10,
wherein the network interface sends, to the management agent, an indication of the timeout threshold, and receives, from the management agent, a trap message that includes an average amount of time required for the management agent to process one object identifier, wherein the management agent sends the trap message in response to determining that the average amount of time required for the management agent to process one object identifier is greater than the timeout threshold, and
wherein the network management application is further operable to update the timeout threshold based on the average amount of time required for the management agent to process one object identifier.

17. The network management device of claim 10, wherein the network management application is further operable to determining that the response message indicates an error condition for at least one object identifier included in the request message, and update the data repository of the network management device to indicate the error condition for the at least one object identifier.

18. The network management device of claim 17, wherein the network management application is further operable to determine whether one or more requested object identifiers are associated with an error condition by at least querying the data repository, and, responsive to determining that at least one of the one or more requested object identifiers is associated with the error condition, generate a second request message that does not include the at least one of the one or more requested object identifiers associated with the error condition.

19. A non-transitory computer-readable storage medium encoded with instructions that cause one or more programmable processors of a network management device to:
store, in a data repository of the network management device, object identifier processing time information including an amount of time required for a management agent executing on a managed device to process one or more object identifiers, wherein each of the one or more object identifiers identifies respective information stored by the managed device;
identify a set of requested object identifiers such that a predicted amount of time required for the network management device to receive a response to a request message that includes a request for the requested set of object identifiers satisfies a timeout threshold, wherein the predicted amount of time required for the network management device to receive the response to the request message is based at least in part on the amount of time required for the management agent to process the one or more object identifiers stored by the device management system;
generate the request message including the set of requested object identifiers
send, to a management agent, the request message;
receive the response message from the management agent;
determine an amount of time that elapsed between when the network management device sent the request message and received the response message; and
responsive to determining that the amount of time that elapsed does not satisfy the timeout threshold, update at least one of the object identifier processing time information and the timeout threshold.

20. The non-transitory computer-readable storage medium of claim 19 further encoded with instructions for causing the one or more processors to:
determine, based on the object identifier processing time information stored by the network management device, a predicted amount of time required for the management agent to process the set of requested object identifiers;
determine a predicted network delay, wherein the network delay includes an amount of time required for the request message to travel over a network from the network management device to the management agent and an amount of time required for the response message to travel over the network from the management agent to the network management device; and
determine the predicted amount of time required for the network management device to receive a response to the request message based at least in part on the predicted amount of time required for the management agent to process the set of requested object identifiers and the predicted network delay.

* * * * *